(12) United States Patent
Mitchell

(10) Patent No.: US 9,694,722 B1
(45) Date of Patent: Jul. 4, 2017

(54) PROTECTIVE SHIELD FOR AN INFANT SEAT

(71) Applicant: Tijuana L Mitchell, Keller, TX (US)

(72) Inventor: Tijuana L Mitchell, Keller, TX (US)

( * ) Notice: Subject to any disclaimer, the term of this patent is extended or adjusted under 35 U.S.C. 154(b) by 0 days.

(21) Appl. No.: 14/933,146

(22) Filed: Nov. 5, 2015

Related U.S. Application Data

(60) Provisional application No. 62/101,472, filed on Jan. 9, 2015.

(51) Int. Cl.
```
A47C 7/66      (2006.01)
A47C 7/72      (2006.01)
B60N 2/28      (2006.01)
B60R 11/02     (2006.01)
B60R 11/00     (2006.01)
```

(52) U.S. Cl.
CPC ........ *B60N 2/2884* (2013.01); *B60R 11/0235* (2013.01); *B60R 2011/0012* (2013.01)

(58) Field of Classification Search
CPC ............. B60N 2/2884; B60R 11/0235; B60R 2011/0012
USPC ............................. 297/184.13, 217.3, 217.4
See application file for complete search history.

(56) References Cited

U.S. PATENT DOCUMENTS

| | | | | |
|---|---|---|---|---|
| 4,314,727 A * | 2/1982 | Potts | ......................... | A47C 7/66 297/184.13 X |
| 4,579,385 A * | 4/1986 | Koenig | ..................... | B60N 2/28 297/184.13 X |
| 5,074,616 A * | 12/1991 | Smith | ....................... | A47C 7/66 297/184.13 |
| 5,083,837 A * | 1/1992 | Roach | ....................... | A47C 7/66 297/184.13 |
| 5,522,639 A * | 6/1996 | Jaime | ....................... | B60N 2/28 297/184.13 X |
| 5,716,095 A * | 2/1998 | Lopez | ................... | B60N 2/2839 297/184.13 |
| 5,730,490 A * | 3/1998 | Mortenson | .............. | A47D 13/02 297/184.13 X |
| 5,765,856 A * | 6/1998 | Kiser | ........................ | B62B 9/14 297/184.13 X |
| 5,806,924 A * | 9/1998 | Gonas | ................... | B60N 2/2821 297/184.13 X |
| 7,150,499 B2 * | 12/2006 | McGregor | ............ | B60N 2/2842 297/184.13 |
| 7,213,878 B2 * | 5/2007 | Delapaz | ................... | B62B 9/142 297/184.13 |
| 8,777,311 B1 * | 7/2014 | Laurel, Jr. | ................ | A47D 1/00 297/217.3 |
| 8,931,839 B1 * | 1/2015 | Laurel, Jr. | ................ | A47D 1/00 297/217.3 |
| 2004/0245812 A1 * | 12/2004 | Wang | ....................... | B60N 2/26 297/184.13 |

* cited by examiner

*Primary Examiner* — Rodney B White
(74) *Attorney, Agent, or Firm* — Kenneth L Tolar

(57) ABSTRACT

A protective shield for an infant seat includes a transparent enclosure having a top wall, two spaced, opposing sidewalls and an inclined front wall. The front wall includes an audiovisual system for playing video and/or audio recordings to entertain the child. The enclosure is attached to a child seat with a swiveling clamp that allows the enclosure to be pivoted onto and away from a seated child.

15 Claims, 2 Drawing Sheets

PROTECTIVE SHIELD FOR AN INFANT SEAT

CROSS REFERENCE TO RELATED APPLICATIONS

This application is entitled to the benefit of provisional patent application No. 62/101,472 filed on Jan. 9, 2015, the specification of which is incorporated herein by reference.

BACKGROUND OF THE INVENTION

The present invention relates to a shield that protects a child seated within an infant seat from projectiles in the event of a vehicle collision.

DESCRIPTION OF THE PRIOR ART

Infants and toddlers must be restrained in an infant seat when traveling in a vehicle. Though the infant seat prevents the child from being ejected from a passenger seat, the child is exposed to projectiles, such as shattered glass, metal fragments or personal items being transported in the passenger compartment. The projectiles may have sufficient speed to cause serious injury or death if they strike a vulnerable body part.

Accordingly, there is currently a need for a device that protects a restrained infant from flying debris while in an infant seat. The present invention addresses this need by providing a transparent, protective enclosure that encapsulates a child seated within an infant seat.

SUMMARY OF THE INVENTION

The present invention relates to a protective shield for an infant seat comprising a transparent enclosure having a top wall, two spaced, opposing sidewalls and an inclined front wall. The front wall includes an audiovisual system for playing video and/or audio recordings to entertain the child. The enclosure is attached to a child seat with a swiveling clamp that allows the enclosure to be pivoted onto and away from a seated child.

It is therefore an object of the present invention to provide an enclosure for protecting a restrained child from flying debris.

It is therefore another object of the present invention to provide a protective shield for an infant seat having an integral audiovisual system for amusing a restrained child.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
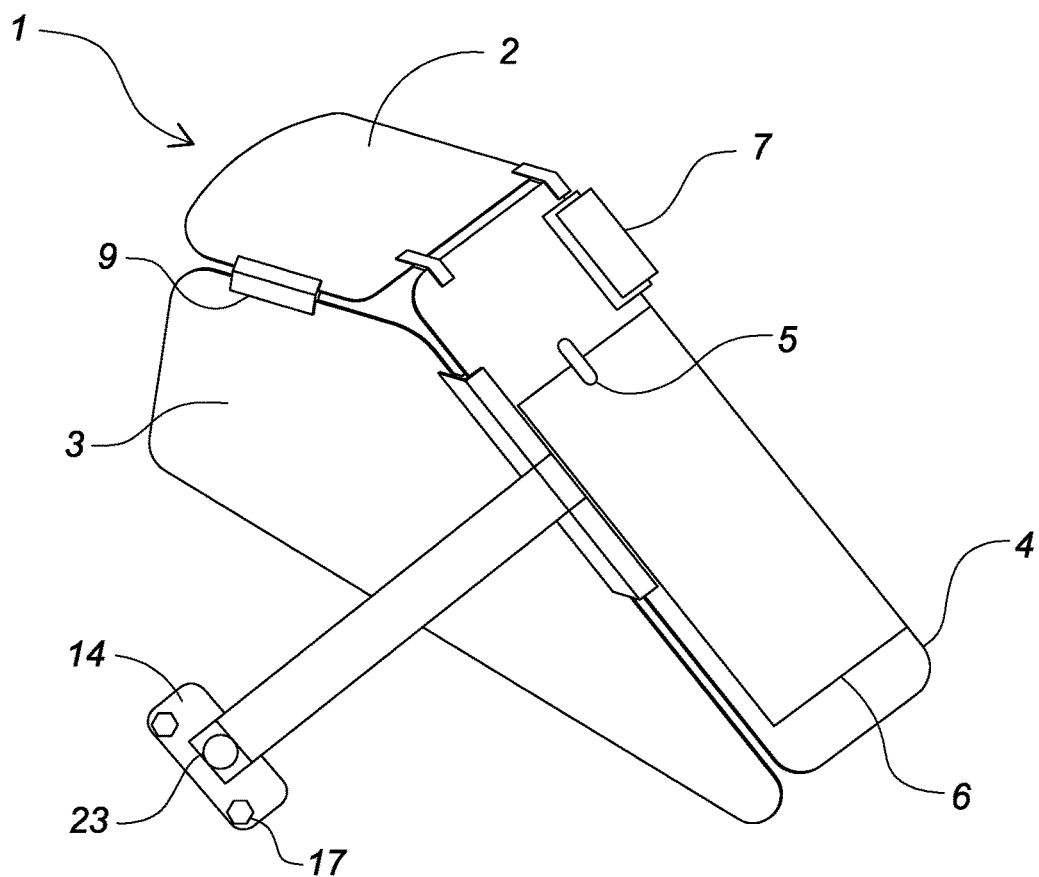
FIG. 1 is a perspective view of the shield according to the present invention.
Figure 2:
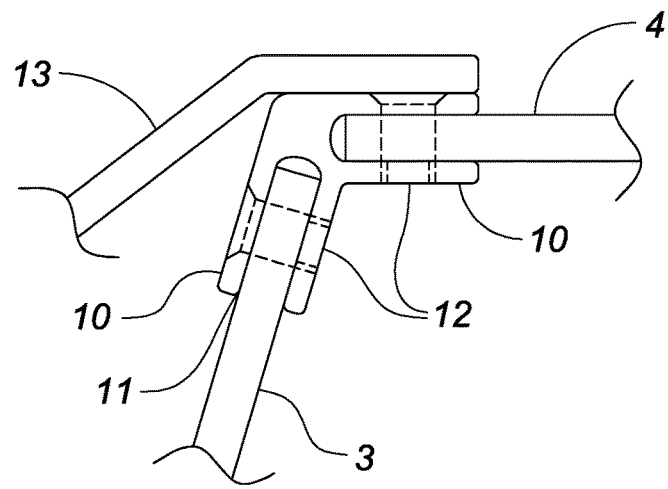
FIG. 2 is a detailed view of an exemplary bracket.
Figure 3:
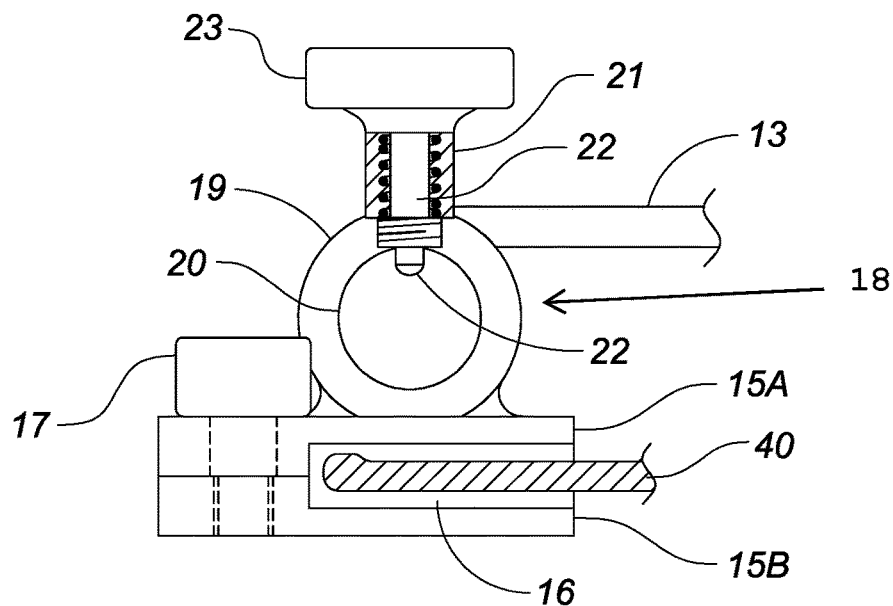
FIG. 3 is a detailed view of the swiveling clamp.
Figure 4:
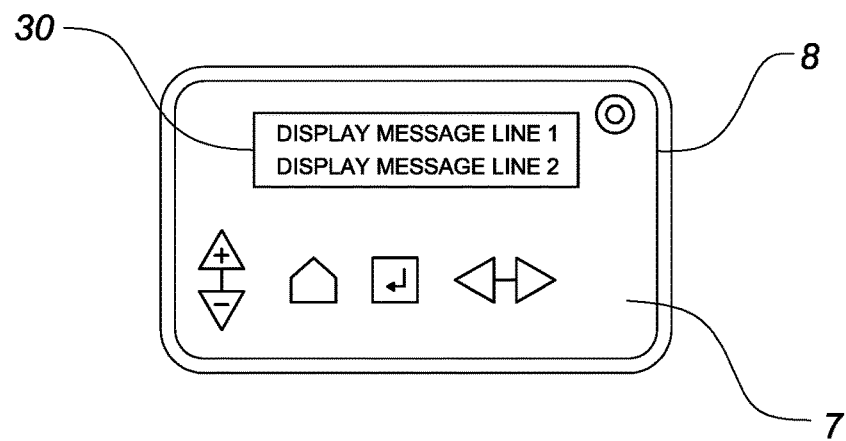
FIG. 4 is an isolated, plan view of the entertainment system.
Figure 5:
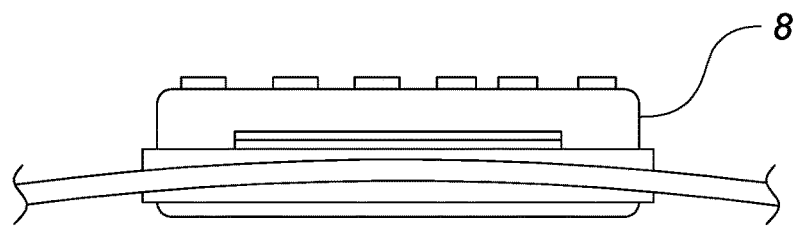
FIG. 5 is a top view of the entertainment system.

The present invention relates to a protective shield for an infant seat comprising an enclosure 1 having a top wall 2, two spaced, opposing sidewalls 3 and an inclined front wall 4. Each of the walls is formed of a transparent, plastic sheet that allows an enclosed child and an external passenger to easily see each other. The front wall includes a tab 5 for displaying a picture 6 and an audiovisual system 7 for playing video and/or audio recordings to entertain the restrained child. The audiovisual system 7 includes a display screen 30 with associated speakers on the interior surface of the front wall for easy viewing by the infant. The audiovisual system is operated with a control panel 8 on the exterior surface of the front wall that is only accessible by an external passenger.

Each wall is adjoined with an adjacent wall using a bracket 9 formed of a pair of flanges 10, each having a slot 11 for receiving an edge of a designated wall. Each slot includes a countersunk screw 12 that is tightened against the sheet to secure it within the bracket.

Attached to the bracket that joins the front wall to one of the sidewalls is a support arm 13 having a swiveling clamp 14 at a distal end that fastens the enclosure to an infant seat. The clamp includes a pair of spaced plates 15A, 15B having rubber-lined inner surfaces that define a cavity 16 therebetween for receiving an edge 40 of the infant-seat shell or frame. A bolt 17 compresses the inner surfaces to securely fasten the clamp to the infant seat.

Mounted atop the upper plate 15A is a hinge 18 having an outer barrel 19 that is affixed to the distal end of the support arm 13. The barrel is selectively rotatable about an inner, tubular bearing member 20 to enable the secured enclosure to pivot onto and away from a seated child. A locking mechanism normally secures the enclosure in either of the two positions until released by a parent or caregiver.

The locking mechanism includes a hollow shaft 21 threaded into a port formed in the barrel. A spring-biased release pin 22 received within the shaft 21 extends through an aperture formed in the barrel and the bearing member. When a cap 23 at the upper end of the pin is lifted, the pin is displaced from the bearing aperture to allow the barrel, and thus the support arm, to freely rotate.

Accordingly, a user bolts the clamp to a side of the infant seat, pulls the release pin and pivots the enclosure over a seated child to form a projectile shield. When removing the child, the user pulls the release pin and easily pivots the enclosure away from the infant seat.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A protective shield for an infant seat comprising:
   an enclosure having a top wall, two spaced-apart, opposing sidewalls and a front wall;
   means for securing said enclosure to an infant seat;
   means for pivoting said enclosure onto and away from a child seated within the infant seat, wherein said means for securing said enclosure to an infant seat comprises a support arm attached to said enclosure, and a swiveling clamp at a distal end of said support arm for gripping an edge of an infant-seat shell.

2. The enclosure according to claim 1 wherein said clamp includes:
- a pair of spaced plates that receive the edge of the infant-seat shell;
- a bolt passing through said pair of spaced plates that is tightened to compress a space therebetween to securely fasten the clamp to the infant seat.

3. The enclosure according to claim 2 wherein said means for pivoting said enclosure onto and away from a child seated within the infant seat comprises a hinge mounted on one of said plates, said hinge having an outer barrel that is affixed to the distal end of the support arm, said barrel rotatable about an inner, tubular bearing member to allow the enclosure to pivot onto and away from a seated child.

4. The enclosure according to claim 3 further comprising a releasable locking mechanism for selectively fixing the enclosure in a select position.

5. The enclosure according to claim 4 wherein said locking mechanism comprises:
- a hollow shaft received within a port formed in said barrel;
- a spring-biased release pin received within the shaft and extending through an aperture formed in the barrel and the bearing member;
- a cap at an upper end of the pin that is lifted to displace said pin from said aperture to allow the barrel and the support arm to freely rotate.

6. The enclosure according to claim 5 wherein said enclosure is formed of a top wall, two spaced-apart, opposing sidewalls and an inclined front wall.

7. The enclosure according to claim 6 further comprising a bracket joining said top wall with one of said sidewalls.

8. The enclosure according to claim 7 wherein said arm includes a proximal end attached to said bracket.

9. The enclosure according to claim 7 wherein said bracket is formed of a pair of flanges, each of said flanges having a slot for receiving an edge of either of said top wall and said sidewall.

10. The enclosure according to claim 9 wherein said slot includes a fastener that is tightened against either of said top wall and said sidewall.

11. The enclosure according to claim 1 wherein said top wall, said sidewalls and said front wall are each formed of a transparent sheet that allows an enclosed child and an external passenger to see each other.

12. The enclosure according to claim 1 further comprising a means for displaying a picture on the front wall of said enclosure to amuse a child seated within the infant seat.

13. The enclosure according to claim 12 further comprising an audiovisual system on the front wall of said enclosure for playing video and audio recordings to entertain a child seated within the infant seat.

14. The enclosure according to claim 13 wherein said audiovisual system includes a display screen and speakers on an interior surface of the front wall for easy viewing by the infant.

15. The enclosure according to claim 14 further comprising a control panel for operating the audiovisual system, said control panel positioned on an exterior surface of the front wall so as to be only accessible by an external passenger.

\* \* \* \* \*